(12) United States Patent
Matsuda

(10) Patent No.: US 8,016,248 B2
(45) Date of Patent: Sep. 13, 2011

(54) AIRCRAFT WING SPOILER ARRANGEMENT

(75) Inventor: Yukitaka Matsuda, Bristol (GB)

(73) Assignee: Airbus Operations Limited, Bristol (GB)

( * ) Notice: Subject to any disclaimer, the term of this patent is extended or adjusted under 35 U.S.C. 154(b) by 601 days.

(21) Appl. No.: 12/216,829

(22) Filed: Jul. 11, 2008

(65) Prior Publication Data

US 2009/0050749 A1    Feb. 26, 2009

(30) Foreign Application Priority Data

Aug. 20, 2007   (GB) .................... 0716199.5

(51) Int. Cl.
    *B64C 9/32*    (2006.01)
    *B64C 23/06*   (2006.01)
(52) U.S. Cl. ........................................ 244/213
(58) Field of Classification Search .......... 244/206, 244/212, 213, 215
    See application file for complete search history.

(56) References Cited

U.S. PATENT DOCUMENTS

| 2,896,880 | A | 7/1959 | Vogler |
| 4,354,648 | A | 10/1982 | Schenk et al. |
| 4,744,532 | A | 5/1988 | Ziegler et al. |
| 6,131,853 | A | 10/2000 | Bauer et al. |
| 6,241,183 | B1 | 6/2001 | Mathieu |
| 2001/0030264 | A1* | 10/2001 | Huenecke ............. 244/213 |
| 2003/0230677 | A1 | 12/2003 | Milliere |
| 2007/0108350 | A1* | 5/2007 | Laporte et al. ........ 244/199.1 |
| 2009/0045289 | A1* | 2/2009 | Bilanin et al. .......... 244/130 |

FOREIGN PATENT DOCUMENTS

| GB | 0530816 | 12/1940 |
| GB | 2066180 | 7/1981 |

OTHER PUBLICATIONS

Great Britain Search Report for GB Application No. 0716199.5, dated Nov. 23, 2007.

* cited by examiner

Primary Examiner — Rob Swiatek
(74) *Attorney, Agent, or Firm* — Nixon & Vanderhye P.C.

(57) ABSTRACT

An aircraft wing comprising an upper surface; and two or more spoilers pivotally attached to the upper surface, wherein at least two adjacent ones of the spoilers are separated by a gap, and wherein the width of the gap is: greater than 1 cm; and sufficiently small to choke the flow of air through the gap such that for at least one flight regime with the adjacent spoilers deployed, the average air flow speed through the gap is less than 10% of the true air speed. The reduced size of the spoilers reduces the spanwise wing loading and the spoiler hinge moment, while providing a net aerodynamic effect (in terms of destroying lift over the wing) similar to that of a conventional spoiler array with no gaps.

14 Claims, 4 Drawing Sheets

AIRCRAFT WING SPOILER ARRANGEMENT

This application claims priority to Great Britain Application No. 0716199.5, filed 20 Aug. 2007, the entire contents of each of which are hereby incorporated by reference.

FIELD OF THE INVENTION

The present invention relates to an aircraft wing incorporating a novel spoiler arrangement.

BACKGROUND OF THE INVENTION

A spoiler is a panel hinged to the upper surface of a wing. The primary function of the spoiler is to reduce lift of the wing, although a secondary effect of the spoiler is to slightly increase the drag of the wing due to the increase in frontal area presented by the spoiler. The spoiler may be deployed during cruise, during landing approach, and/or during landing.

Conventionally an array of such spoilers is provided for failsafe purposes. That is, each spoiler is controlled by an independent actuator so that if one of the actuators fails the remaining spoilers can still be deployed. The individual spoilers are closely spaced with no gap between the spoilers. Generally, spoilers are made from solid material such as metal or composite. The edges of the spoilers include solid rubber seals which prevent the leakage of airflow between them in both their deployed and retracted positions.

The physical size of a spoiler depends on the requirements of lift reduction and speed reduction during the various flight phases. However, it would be desirable to reduce the size of the spoilers and the associated complexity of the actuation mechanisms which are used to control them, as long as the same aerodynamic effect is maintained.

SUMMARY OF THE INVENTION

A first aspect of the invention provides an aircraft wing comprising an upper surface; and two or more spoilers pivotally attached to the upper surface, wherein at least two adjacent ones of the spoilers are separated by a gap, and wherein the width of the gap is:
a. greater than 1 cm; and
b. sufficiently small to choke the flow of air through the gap such that for at least one flight regime with the adjacent spoilers deployed, the average air flow speed through the gap is less than 10% of the true air speed.

A further aspect of the invention provides a method of operating an aircraft wing comprising an upper surface; and two or more spoilers pivotally attached to the upper surface, wherein at least two adjacent ones of the spoilers are separated by a gap having a width greater than 1 cm, the method comprising:
a. moving the aircraft relative to an air mass at a true air speed; and
b. pivoting the adjacent spoilers into a deployed position in which the average air flow speed through the gap is less than 10% of the true air speed.

Typically the width of the gap is sufficiently small to choke the flow of air through the gap such that for at least one flight regime with the adjacent spoilers deployed, they generate flow vortices and/or boundary layers which interfere with each other.

Typically the width of the gap is sufficiently small to choke the flow of air through the gap such that for at least one flight regime with the adjacent spoilers deployed, the average air flow speed through the gap is less than 8% of the true air speed, and most preferably less than 5%.

Typically the width of the gap is sufficiently small to choke the flow of air through the gap such that for at least one flight regime with the adjacent spoilers deployed, the maximum air flow speed through the gap is less than 10% of the true air speed, preferably less than 8% and most preferably less than 5%.

The gap width may be selected to provide the desired effects during one or more flight regimes including cruise, landing approach, and/or landing.

If the smallest one of the two adjacent spoilers has a projected length L when viewed in the direction of flight of the aircraft; then the width of the gap is typically greater than 0.1L and less than 0.3L.

Typically the width of the gap is less than 50 cm.

The gap may have a uniform or non-uniform width. For instance the gap may be defined by a pair of opposing sides of the adjacent spoilers; and each side is shaped with one or more projections or recesses.

In the case where the gap has a non-uniform width, then at least the maximum width of the gap is greater than 1 cm, and preferably the minimum width is also greater than 1 cm.

The width of the gap may be adjustable in-flight, for instance by translating, expanding or rotating one or both of the spoilers. This enables the gap to be made relatively wide when the aircraft is flying at low speeds, and relatively narrow when the aircraft is flying at high speeds.

The adjacent spoilers may include rubber seals along their edges. In this case the gap comprises an air gap between the rubber seals.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
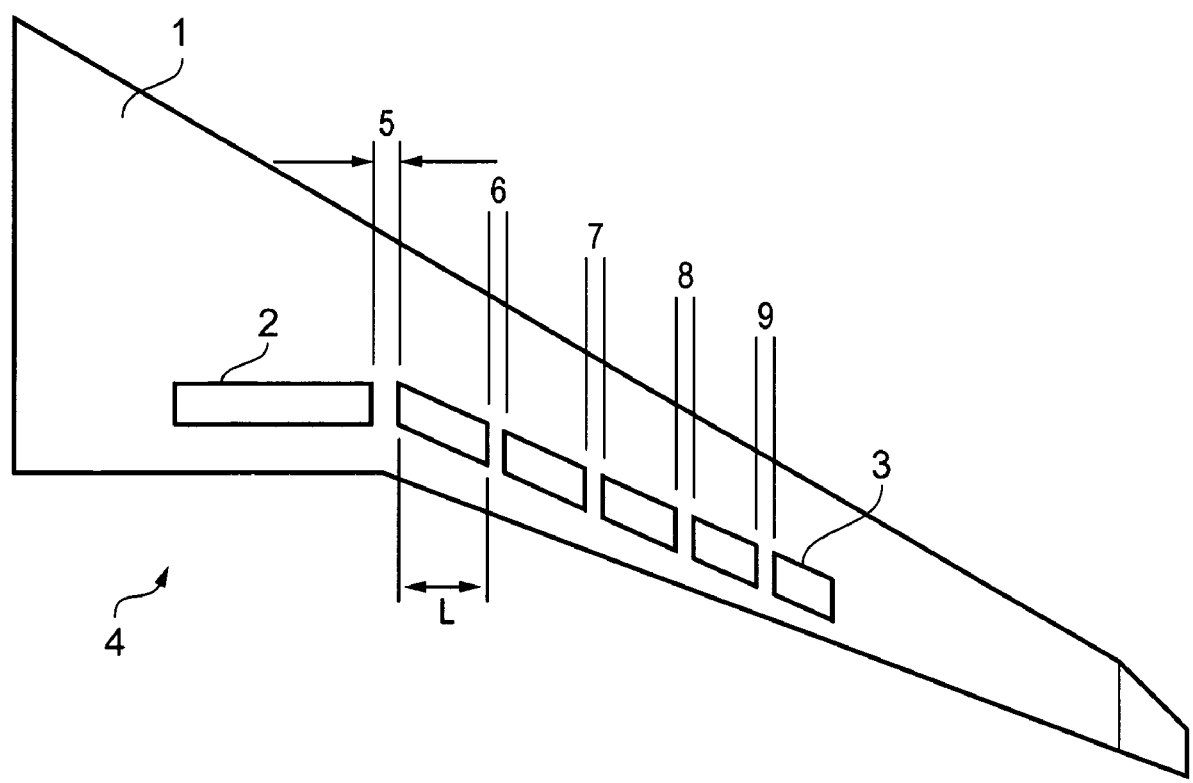
FIG. 1 is a plan view of an aircraft wing.

An aircraft wing shown in FIG. 1 has an upper surface 1; and a line of spoilers including a relatively large inboard spoiler 2 (oriented at right angles to the aircraft's direction of flight 4) and four relatively small outboard spoilers 3 (which are swept back relative to the aircraft's direction of flight 4).

The spoilers 2,3 are pivotally attached to the upper surface 1, and each is controlled by an independent actuator which can pivot the spoiler up into a deployed position, and down into an inoperative position in which the spoiler lies flush with the upper surface 1.

The spoilers 2,3 include rubber seals along their edges which seal with complementary rubber seals in the upper surface of the wing when the spoilers are retracted. When the spoilers are deployed, then air gaps 5-9 open up between the adjacent spoilers. As shown in detail in FIG. 2, the smaller spoilers 3 have a projected length L when viewed in the direction of flight 4 of the aircraft, and the width of the gap 5 is approximately ⅕L. For example, L may be approximately 2 meters, so the width of the gap is 40 cm.

Without wishing to be bound by theory, it is postulated that by making the width of the gap sufficiently small, the downstream effect of turbulence generated by the sides 10,11 of the spoilers tends to choke the flow of air. That is, the adjacent spoilers generate flow vortices illustrated schematically at 14,15 in FIG. 3 which interfere with each other downstream of the gap in an interference region 16. This can be explained by analogy with a moving air stream passing an aperture. For certain stream velocities, resonance occurs (a whistle). This constructive interference caused a standing wave to be set up in the gap. For specific gap widths, the vortices will destructively interfere and effectively cancel each other out. When this occurs, there is an incompressible flow area between the spoilers which will act like a physical barrier—i.e., as a conventional spoiler surface. Alternatively the choking effect can be described in terms of an interference between boundary layers of the two adjacent spoilers.

True air speed is the speed of an aircraft relative to the air mass in which it moves, i.e. the magnitude of the vector difference of the velocity of the aircraft and the velocity of the air. Under zero wind conditions and in horizontal flight, this is equal to the speed over the ground. It is believed that a width of ⅕L is sufficiently small to choke the flow of air through the gap when the spoilers are deployed in a number of flight regimes including cruise, landing approach and landing. This choking effect will reduce the average air flow speed through the gap, and typically this will be of the order of 5% of the true air speed.

It is believed that this ⅕ L ratio is likely to be valid if the projected length of the larger spoiler 2 is not greater than 2L. Note however that the optimal width of the gaps depends on the wing shape, wing planform, wing sweep angle, cruise mach number, design mach number and the location of the spoiler within the planform of the wing, so may vary from the width shown.

The reduced weight and area of the spoilers 2,3 reduces the spanwise wing loading and the spoiler hinge moment, whilst providing a net aerodynamic effect (in terms of destroying lift over the wing) similar to that of a conventional spoiler array with no gaps. The reduced spoiler hinge moment enables lighter and less complex actuation mechanisms to be used to deploy them. There is also an increase in efficiency due to the reduction of deployed spoiler frontal area.

Figure 2:
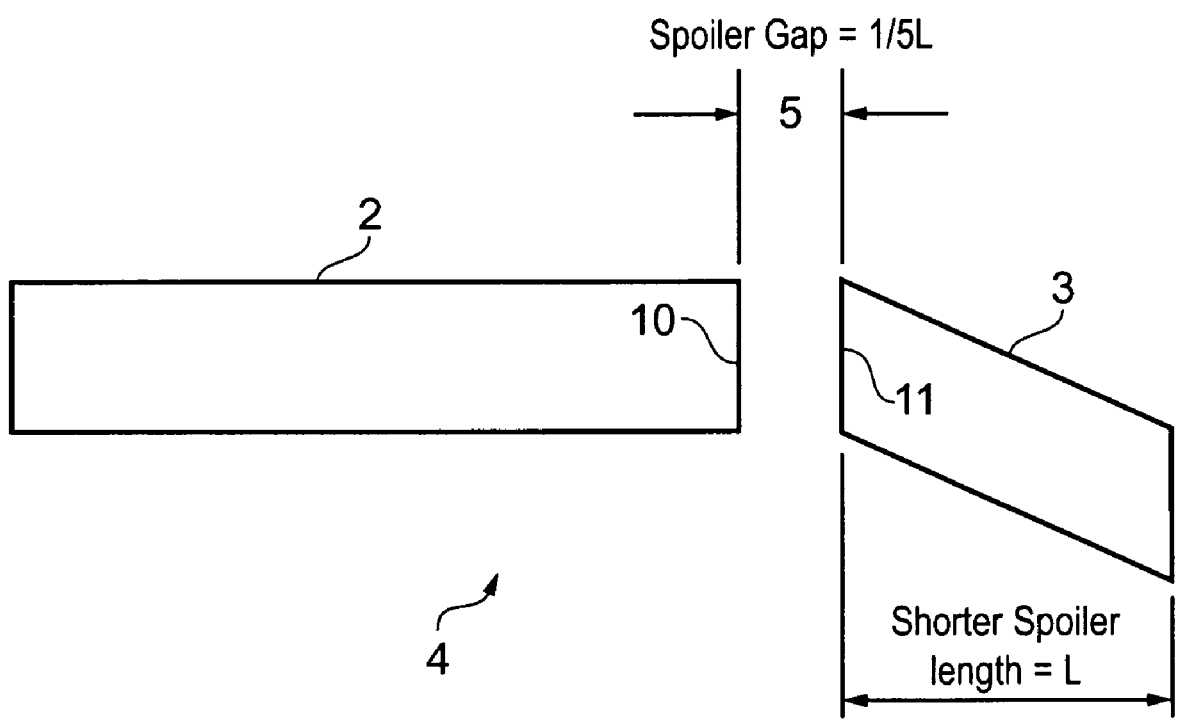
FIG. 2 is an enlarged view of two of the spoilers.
Figure 3:
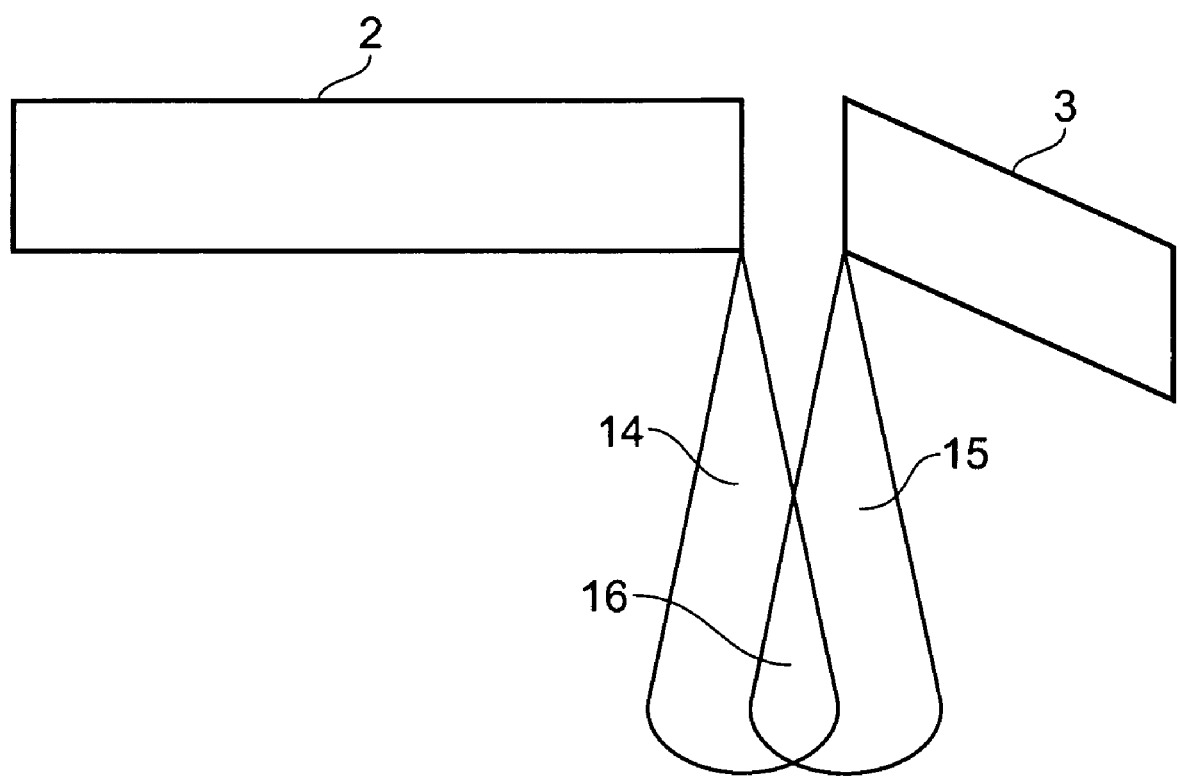
FIG. 3 is an enlarged view of two of the spoilers showing flow vortices.
Figure 4:
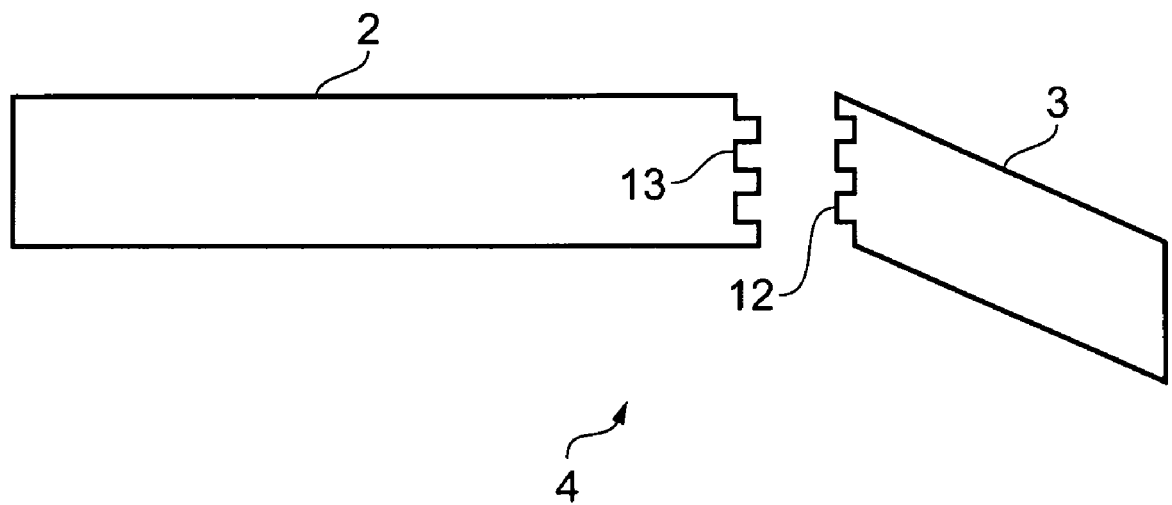
FIG. 4 is a plan view of an alternative pair of spoilers.

In the arrangement shown in of FIGS. 1-3 the gaps are rectangular. However the pair of opposing sides of the adjacent spoilers may be shaped with one or more projections or recesses. For instance with reference to FIG. 4 the sides of the spoilers may be castellated as shown with projections 12 and recesses 13.

Although the invention has been described above with reference to one or more preferred embodiments, it will be appreciated that various changes or modifications may be made without departing from the scope of the invention as defined in the appended claims.

The invention claimed is:

1. An aircraft wing comprising an upper surface; and two or more spoilers pivotally attached to the upper surface, wherein at least two adjacent ones of the spoilers are separated by a gap, and wherein the width of the gap is:
   a. greater than 1 cm; and
   b. sufficiently small to choke the flow of air through the gap such that for at least one flight regime with the adjacent spoilers deployed, the average air flow speed through the gap is less than 10% of the true air speed.

2. The wing of claim 1 wherein the width of the gap is sufficiently small to choke the flow of air through the gap such that for at least one flight regime with the adjacent spoilers deployed, they generate flow vortices which interfere with each other.

3. The wing of claim 1 wherein the width of the gap is sufficiently small to choke the flow of air through the gap such that for at least one flight regime with the adjacent spoilers deployed, they form boundary layers which interfere with each other.

4. The wing of claim 1 wherein the width of the gap is sufficiently small to choke the flow of air through the gap such that for at least one flight regime with the adjacent spoilers deployed, the average air flow speed through the gap is less than 8% of the true air speed.

5. The wing of claim 1 wherein the width of the gap is sufficiently small to choke the flow of air through the gap such that for at least one flight regime with the adjacent spoilers deployed, the maximum air flow speed through the gap is less than 10% of the true air speed.

6. The wing of claim 1 wherein the width of the gap is sufficiently small to choke the flow of air through the gap such that for at least one flight regime with the adjacent spoilers deployed, the maximum air flow speed through the gap is less than 8% of the true air speed.

7. The wing of claim 1 wherein the smallest one of the two adjacent spoilers has a projected length L when viewed in the direction of flight of the aircraft; and wherein the width of the gap is greater than 0.1L.

8. The wing of claim 1 wherein the smallest one of the two adjacent spoilers has a projected length L when viewed in the direction of flight of the aircraft; and wherein the width of the gap is less than 0.3L.

9. The wing of claim 1 wherein the width of the gap is less than 50 cm.

10. The wing of claim 1 wherein the gap is defined by a pair of opposing sides of the adjacent spoilers; and each side has one or more projections or recesses.

11. The wing of claim 1 wherein the width of the gap is adjustable in-flight.

12. A method of operating an aircraft wing comprising an upper surface and two or more spoilers pivotally attached to the upper surface, wherein at least two adjacent ones of the spoilers are separated by a gap having a width greater than 1 cm, the method comprising:
   a. moving the aircraft relative to an air mass at a true air speed; and
   b. pivoting the adjacent spoilers into a deployed position in which the average air flow speed through the gap is less than 10% of the true air speed.

13. The method of claim 12 wherein the gap has a width which is sufficiently small such that the average air flow speed through the gap is less than 8% of the true air speed.

14. An aircraft wing comprising an upper surface and two or more spoilers pivotally attached to the upper surface, wherein the geometry of and separation between the spoilers is adapted so that for at least one flight regime, when adjacent spoilers are deployed, they generate flow vortices which destructively interfere with each other.

* * * * *